United States Patent
Adir et al.

(10) Patent No.: US 12,206,757 B2
(45) Date of Patent: Jan. 21, 2025

(54) EFFICIENT RANDOM MASKING OF VALUES WHILE MAINTAINING THEIR SIGN UNDER FULLY HOMOMORPHIC ENCRYPTION (FHE)

(71) Applicant: International Business Machines Corporation, Armonk, NY (US)

(72) Inventors: Allon Adir, Kiryat Tivon (IL); Ramy Masalha, Kafr Qari (IL); Ehud Aharoni, Kfar Saba (IL)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 17/960,956

(22) Filed: Oct. 6, 2022

(65) Prior Publication Data

US 2024/0137205 A1    Apr. 25, 2024

(51) Int. Cl.
*H04L 9/00* (2022.01)
*H04L 9/06* (2006.01)

(52) U.S. Cl.
CPC ............ *H04L 9/008* (2013.01); *H04L 9/0618* (2013.01)

(58) Field of Classification Search
CPC ..... H04L 9/008; H04L 9/0618; H04L 9/3093; H04L 2209/046
See application file for complete search history.

(56) References Cited

U.S. PATENT DOCUMENTS

| | | | |
|---|---|---|---|
| 9,900,147 B2* | 2/2018 | Laine | H04L 9/0618 |
| 10,075,289 B2* | 9/2018 | Laine | G09C 1/00 |
| 10,153,894 B2* | 12/2018 | Laine | G06F 7/483 |
| 11,502,820 B2* | 11/2022 | Ratha | H04L 9/065 |
| 11,902,424 B2* | 2/2024 | Ratha | H04L 9/0877 |
| 12,041,157 B2* | 7/2024 | Sarpatwar | H04L 9/0894 |
| 2020/0358601 A1* | 11/2020 | Gama | H04L 9/085 |
| 2023/0085239 A1* | 3/2023 | Adir | H04L 63/0428 713/189 |
| 2023/0421351 A1* | 12/2023 | Yampolsky | H04L 9/008 |

(Continued)

FOREIGN PATENT DOCUMENTS

WO    2020216875 A1    10/2020

OTHER PUBLICATIONS

Bonte, et al., "Towards practical privacy-preserving genome-wide association study," BMC Bioinformatics, 2018.

(Continued)

*Primary Examiner* — Han Yang
(74) *Attorney, Agent, or Firm* — Michael O'Keefe

(57) ABSTRACT

A method, apparatus and computer program product for privacy-preserving homomorphic inferencing. In response to receipt of encrypted data, a ciphertext of real numbers is generated. Each real number has an associated sign that is desired to be maintained. A mask is then identified, preferably via an iterative algorithm that works on a trial and error basis to locate an appropriate solution. The mask comprises set of values randomly distributed over a given positive range and that remain positive after encoding under a fixed-point arithmetic and with a low scale value. Under homomorphic encryption, the ciphertext is then multiplied by the mask to generate a result comprising values corresponding to the real numbers in the ciphertext and that maintain their associated signs. The result is provided as a response to the encrypted data.

18 Claims, 4 Drawing Sheets

(56) References Cited

U.S. PATENT DOCUMENTS

| | | | |
|---|---|---|---|
| 2024/0039691 A1* | 2/2024 | Ezov | G06N 3/08 |
| 2024/0243898 A1* | 7/2024 | Kushnir | G06N 5/04 |
| 2024/0275577 A1* | 8/2024 | Drucker | H04L 9/008 |
| 2024/0275579 A1* | 8/2024 | Mirkin | H04L 9/008 |
| 2024/0380569 A1* | 11/2024 | Drucker | H04L 9/008 |

OTHER PUBLICATIONS

K.B. et al., "Homomorphic Authentication With Random Masking Technique Ensuring Privacy & Security In Cloud Computing", BioInfo Security Informatics, Mar. 15, 2012, vol. 2, Issue 2, 49-52 pp.

Bonte, "Optimising Privacy-Preserving Computations", KU Leuven, Arenberg Doctoral School, Faculty of Engineering Science, Jun. 2021, 266 pages.

\* cited by examiner

```
    min= 1
    while min <= maxval/2:
    for i in [0,number-of-trials]:
(1)     R=vector of N random values in [min,maxval]
(2)     E=encode(R) under CKKS with scale=1
(3)     D=decode(E)
(4)     if D encodes a vector of positive values:
            return E
(5)     min=min*2
    return not-found
```

EFFICIENT RANDOM MASKING OF VALUES WHILE MAINTAINING THEIR SIGN UNDER FULLY HOMOMORPHIC ENCRYPTION (FHE)

BACKGROUND OF THE INVENTION

Technical Field

This disclosure relates generally to the use of homomorphic encryption operations to facilitate inferencing against encrypted data.

Background of the Related Art

Homomorphic encryption is a form of encryption that permits users to perform computations on encrypted data without first decrypting that data. The computations are left in an encrypted form which, when decrypted, result in an identical output to that produced had the operations been performed on the unencrypted data. Homomorphic encryption includes multiple types of encryption schemes that can perform different classes of computations over encrypted data. One of these types is Fully Homomorphic Encryption (FHE).

In FHE, computations are performed over encrypted data, where the manipulated data often is in a form of a vector of slots containing values. In some FHE system use cases, a user may query the FHE system to return a vector where only the signs of the computed values are required by the user and, further, where it is desired that information beyond the sign should not be disclosed to the user. For example, consider an FHE system wherein a user queries for positive or negative state of N bank accounts. An answer to this query can be in the form of a vector of N slots containing values (−1, 1) depending on the sign of the account associated with a particular slot. Another valid answer could be a vector of N slots containing random positive/negative values that correspond to the positive or negative state of the corresponding account. In either case, however, the answer should not contain information that would leak the actual value of the account(s). Another example is a use case for an FHE system where alert reports are to sent to a control center in the form of a vector of slots where each slot corresponds to a different monitored device, and where each such slot contains a value that indicates whether there is an alert associated with that device. For example, a negative value could imply no alert, while a positive value could imply the existence of an alert. Once again, in this scenario it is desired that the actual value in the slot should not reveal any further information about the alert such as may leak during the computation of the alert based on the device's behavior.

One simple solution to the above-described requirement (preventing information leakage) would be to first compute the vector (with the positive and negative values), and then compute a sign function of those original values. Computing sign under FHE, however, can be very costly, and slight inaccuracies in the results may reveal information about the original values. Another possible solution to this problem is to mask the original values while maintaining sign, e.g., by multiplying all of the slots with some random positive value r. This alternative method, however, would still potentially leak the original ratio of the slot values. Yet another possible solution is to use a different positive random value r for each of the slots. While this latter method would address the requirement to prevent information leakage, it is costly from a computation perspective. In particular, when performing this product under FHE, the original vector V is multiplied by the vector R (corresponding to the different positive random values r), and this product operation has a cost of one (1) multiplication. Such multiplications are costly in new-generation FHE systems that support a fixed-point arithmetic and that utilize "rescaling" to scale down an encrypted message after a multiplication. One such scheme is CKKS, an acronym referring to the authors of that scheme (Cheon-Kim-Kim-Song). The rescaling operation otherwise makes the CKKS scheme an efficient method for evaluating polynomial approximations (as currently CKKS is the only FHE scheme that supports real numbers), thereby making it a preferred approach for implementing privacy-preserving machine learning applications. That said, if the above-described solution is implemented in FHE using CKKS, after a small number of rescales a costly bootstrap of the system is needed.

There remains a need to provide techniques that efficiently mask vector slot values while maintaining their sign under FHE and that delays or avoids future rescale and/or bootstrap of the FHE system utilizing an approach such as CKKS.

BRIEF SUMMARY

According to a first aspect of this disclosure, a method for privacy-preserving homomorphic inferencing is provided. The method begins by receiving an encrypted data point. In response to receipt of the encrypted data point, a ciphertext having one or more real numbers is generated. Each real number in the ciphertext has an associated sign that is desired to be maintained. A mask is then identified. The mask comprises a set of values that are randomly distributed over a given positive range and that remain positive after encoding under a fixed-point arithmetic and with a scale value. The mask is identified via an iterative algorithm that works on a trial and error basis to locate an appropriate solution. Under homomorphic encryption, the ciphertext is then multiplied by the mask to generate a result. The result comprises one or more values corresponding to the one or more real numbers in the ciphertext. The one or more values in the result maintain the associated signs of the one or more real numbers in the ciphertext to which the values correspond. The result is then provided as a response to the encrypted data point.

Preferably, the fixed-point arithmetic is a homomorphic encryption scheme for approximate arithmetic (e.g., CKKS). In the method, the ciphertext is multiplied by the set of values under fully homomorphic encryption. To determine the mask, the iterative algorithm preferably works as follows: for one or more increasing minimum values of a range from which random values are selected, each minimum value as adjusted by the scale value corresponding to an iteration, encodings of the random values under the fixed-point arithmetic are evaluated until the set of values in the mask are identified. Preferably, the scale value is a low value, e.g., =1.

According to a second aspect of this disclosure, an apparatus comprises a processor, and computer memory. The computer memory holds computer program instructions executed by the processor for privacy-preserving homomorphic inferencing. The computer program instructions comprise program code configured to perform operations such as the steps described above.

According to a third aspect of this disclosure, a computer program product in a non-transitory computer readable medium is provided. The computer program product holds computer program instructions executed by a processor in a host processing system configured for privacy-preserving homomorphic inferencing. The computer program instructions comprise program code configured to perform operations such as the steps described above.

Masking a vector of (encrypted) real values under fully homomorphic encryption while maintaining their sign enables converting of non-Boolean results to Boolean while hiding intermediate values, thereby ensuring that the least information as possible is exposed during the FHE process. By using a random mask of positive numbers encoded with a low scale (e.g., =1) reduces the product (multiplication) cost of performing this masking operation, as products are otherwise costly in FHE computations. In particular, the approach herein reduces multiplication depth because it circumvents paying in multiplication levels for multiplying with the mask.

The foregoing has outlined some of the more pertinent features of the disclosed subject matter. These features should be construed to be merely illustrative. Many other beneficial results can be attained by applying the disclosed subject matter in a different manner or by modifying the subject matter, as will be described below.

BRIEF DESCRIPTION OF THE DRAWINGS

For a more complete understanding of the subject matter herein and the advantages thereof, reference is now made to the following descriptions taken in conjunction with the accompanying drawings, in which.

DETAILED DESCRIPTION OF AN ILLUSTRATIVE EMBODIMENT

Figure 1:
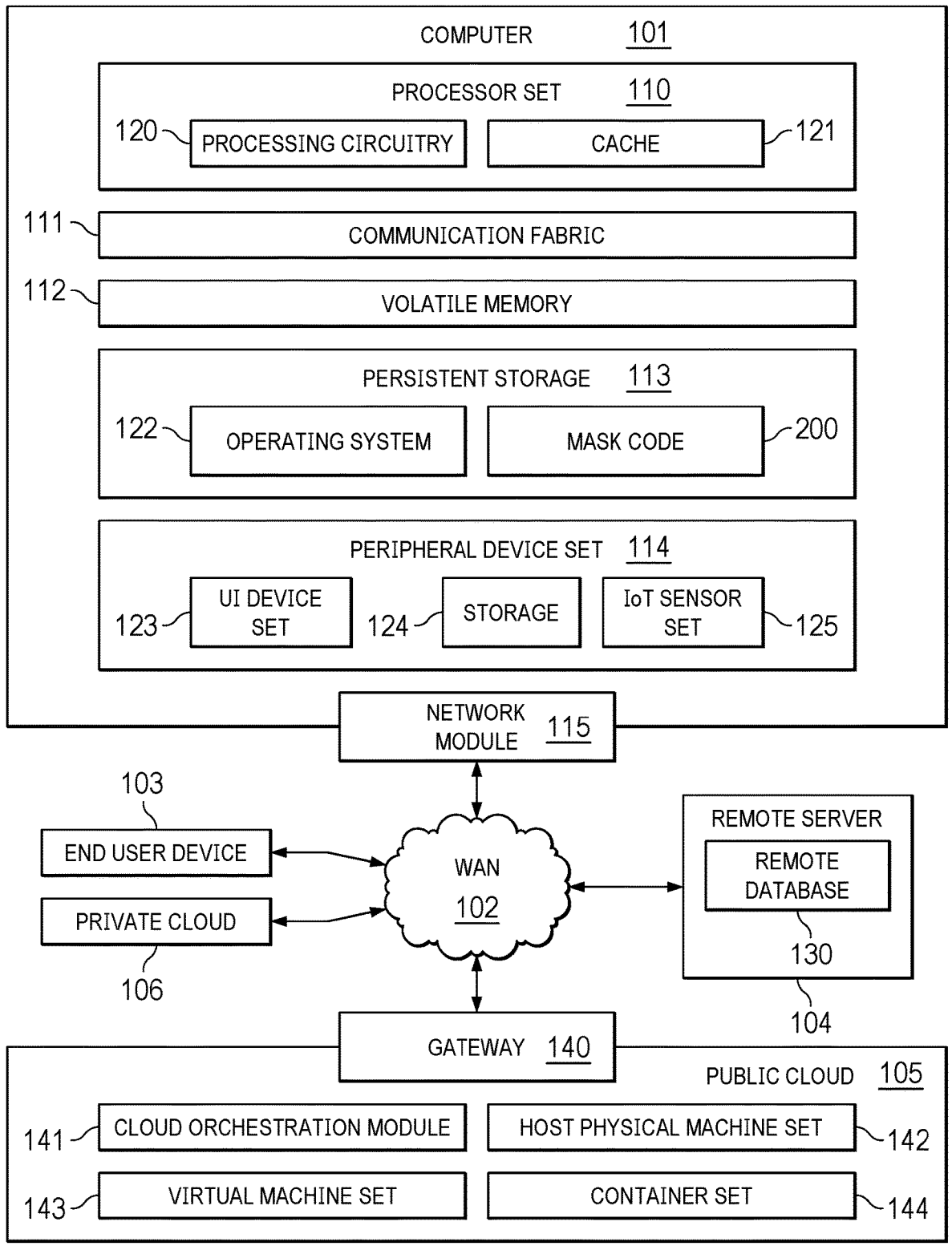
FIG. 1 depicts an exemplary block diagram of a data processing system in which exemplary aspects of the illustrative embodiments may be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as masking code 200 of this disclosure that facilitates efficient random masking of values while maintaining sign under FHE. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor Set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

Communication Fabric 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile Memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent Storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as Linux, various known proprietary operating systems or open source Portable Operating System Interface-type operating systems that employ a kernel. The code included in block 200 typically includes at least some of the computer code involved in performing the inventive methods.

Peripheral Device Set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network Module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End User Device (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote Server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public Cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private Cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Homomorphic Encryption

By way of further background, Homomorphic Encryption (HE) is a form of encryption that allows computations to be carried out on ciphertext, thus generating an encrypted result which, when decrypted, matches the result of operations performed on the plaintext. A homomorphic encryption scheme is a cryptosystem that allows computations to be performed on data without decrypting it. Formally, a cryptosystem is homomorphic with respect to operation $\diamond$, if there exists an operation such that $x_1 \diamond x_2 = D(E(x_1, pk)H(E(x_2, pk), sk)$, where E and D represent the encryption and decryption mechanisms, respectively, pk and sk represent the public and private/secret keys, respectively, $x_1$ and $x_2$ are two plaintext operands, and H is a Hadamard product operation. A homomorphic encryption scheme is considered to be fully homomorphic (FHE) if it allows arbitrary computations on the ciphertext. Specifically, given $c_i = E(x_i, pk)$, $i=1, 2, \ldots, K$, an FHE scheme allows the computation of $c=g(c_1, c_2, \ldots, c_K)$ such that $D(c, sk)=f(x_1, x_2, \ldots, x_K)$ for any arbitrary function $f$. FHE is often achieved by employing a somewhat homomorphic (SWHE) or leveled HE scheme in combination with a bootstrapping or recryption technique. The SWHE scheme is capable of supporting computations only up to a preset level of complexity determined by its parameters. This is because the ciphertexts are "noisy," and the noise keeps growing with each HE computation, and once the noise grows beyond some parameter-dependent threshold the ciphertext can no longer be decrypted. This problem may be addressed by bootstrapping, which refreshes the ciphertext and for certain schemes (e.g., Brakerski-Gentry-Vaikuntanathan (BGV)) reduces its noise level, but at the cost of relying on circular security. Bootstrapping, however, is a computationally-expensive and time-consuming operation. Therefore, for practical feasibility, the number of bootstrapping operations should be kept at a minimum and possibly avoided.

Homomorphic encryption enables the construction of programs for any desirable functionality, which can be run on encrypted inputs to produce an encryption of the result. Because such a program need never decrypt its inputs, it can be run by an untrusted party without revealing its inputs and internal state. Toolkits for implementing homomorphic encryption are known. A well-known toolkit is HElib, an open-source project. The current version of HElib supports addition and multiplication operations of arbitrary numbers in binary representation, using encryption of the individual bits.

By way of further background, several FHE schemes have been proposed based on hardness of a computational problem known as Ring Learning with Errors (RLWE). Prominent examples of such schemes include BFV (Brakerski/

Fan-Vercauteren), BGV (Brakerski-Gentry-Vaikuntanathan), and CKKS (Cheon-Kim-Kim-Song) schemes, which schemes (named after the original proposers) are both additively and multiplicatively homomorphic. While the BFV and BGV schemes are efficient for vector operations over integers, the CKKS scheme is more appropriate for "approximate" (limited precision) floating-point operations. Furthermore, these schemes support Single Instruction Multiple Data (SIMD) operations, in particular, by packing different plaintext values into different slots in the ciphertext. This ciphertext packing enables parallelization of addition and multiplication operations.

The following provides additional details regarding CKKS.

CKKS is a homomorphic encryption scheme for approximate arithmetic. It enables homomorphic operations on encrypted data, e.g., where that data has been quantized from some real-world data (e.g., financial, medical, etc.) to an approximate value such as floating-point number to enable the data to be represented by a finite number of bits. The approximate value may substitute for the real-world data, and any rounding error is designed to be small enough so as to avoid impacting the computation. In approximate arithmetic, a few numbers of significant digits (most significant bits (MSBs)) are stored, and the arithmetic operations are carried out between them, with the result rounded by removing some inaccurate least significant bits (LSBs). CKKS enables an approximate addition and multiplication of encrypted messages, and it includes a rescaling operation for managing the size of plaintext. In operation, CKKS truncates a ciphertext into a smaller modulus, which leads to rounding of plaintext. For security purposes, and following the MSBs that contain a message, a noise (sometimes referred to an encryption noise) is added. This noise also is considered to be a part of the error occurring during approximate computations and that is reduced along with plaintext by rescaling. As a result, a decryption structure outputs an approximate value of plaintext with a predetermined precision. The CKKS scheme includes a scaling factor that enables control over encoding and decoding errors that occur during the plaintext rounding process.

More formally, CKKS provides for a method for efficient approximate computation on HE. In this technique, and as noted above, the encryption noise is treated as part of error occurring during approximate computations. An encryption c of message m by a secret key sk has a decryption structure in the form of: $\langle c, sk \rangle = m+e \pmod q$, where e is a small error inserted to guarantee the security of hardness assumptions. If e is small compared to the size of the message, the noise does not affect the significant figures of m, and thus $m'=m+e$ can replace the original message in approximate arithmetic. In this process, and as also noted, a scale factor may be multiplied to the message before encryption to reduce the precision loss from encryption noise. For homomorphic operations, the decryption structure is small compared to a ciphertext modulus, and the above-mentioned rescaling operation reduces the size of the ciphertext modulus and ensures that the bit size of the ciphertext modulus grows linearly (instead of exponentially) with the depth of a circuit.

In general, bootstrapping is what makes HE into FHE because it enables computations of unlimited depth. Whenever the computation reaches a maximal depth, it is necessary to bootstrap to start with fresh available products. The FHE scheme has limited computational depth due to the need for scale management. In CKKS, the bootstrapping does not remove noise but rather brings the scale to useful levels.

When the CKKS scheme (e.g., as implemented in the HElib library) for FHE operations, real-valued features may be input to a model directly, i.e., there is no requirement to transform the inputs as integers.

Machine Learning-As-A-Service Using Homomorphic Encryption

Figure 2:
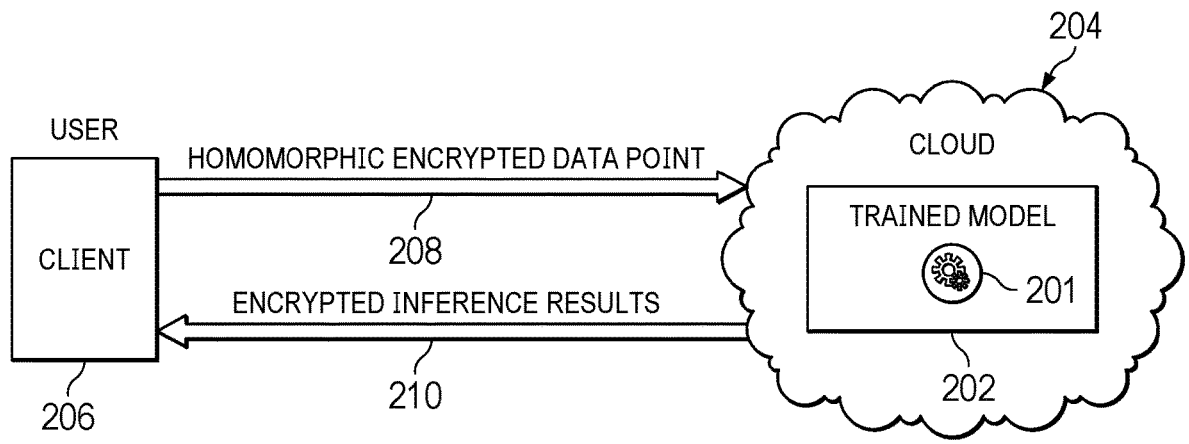
FIG. 2 is a representative Machine Learning as-a-service (MLaaS) operating environment in which the techniques of this disclosure may be implemented.

With reference now to FIG. 2, a representative (but non-limiting) operating environment for the technique herein is depicted. As shown, in a typical machine learning (ML) as a service scenario, a trained model such as a decision tree 201 is hosted on a cloud server 202 (sometimes referred to herein as Cloud) in a cloud computing infrastructure 204 such as described above. The model/tree (or other decision logic) 201 may be exposed as an Application Programming Interface (API) on the cloud 204. In operation, and as a service, the hosting cloud server 202 allows users to run inference queries on the model/tree 201. Typically, a user (sometimes referred to herein as Client) is associated with a client machine 206, and the client and server are configured to operate according to a client-server model. A homomorphic encryption (HE) protocol is enforced across the client-server operating environment such that the Cloud protects the model's privacy while users (Clients) maintain the privacy of their scoring data points returned by the model/tree. In a typical request-response workflow, the client 206 sends an encrypted query 208 (e.g., a data point) to the cloud server 202, the cloud server 202 applies the model/tree 201 and then returns a response 210. The response includes the encrypted inference results. In this manner, privacy-preserving inference problems are securely evaluated.

Thus, as depicted in FIG. 2, the Client homomorphically-encrypts its data points and shares them with the Cloud. In this example, the Cloud then uses the public key received from the Client to encrypt its model, and it homomorphically-evaluates the decision tree on the encrypted data points. The Cloud does not need to encrypt its model before using on inference on the encrypted data point supplied by the user. This is because CKKS (and other schemes) allow computations to be performed that involve both ciphertexts (like the user's data point) and plaintexts (e.g., the Cloud's model).

Figure 3:
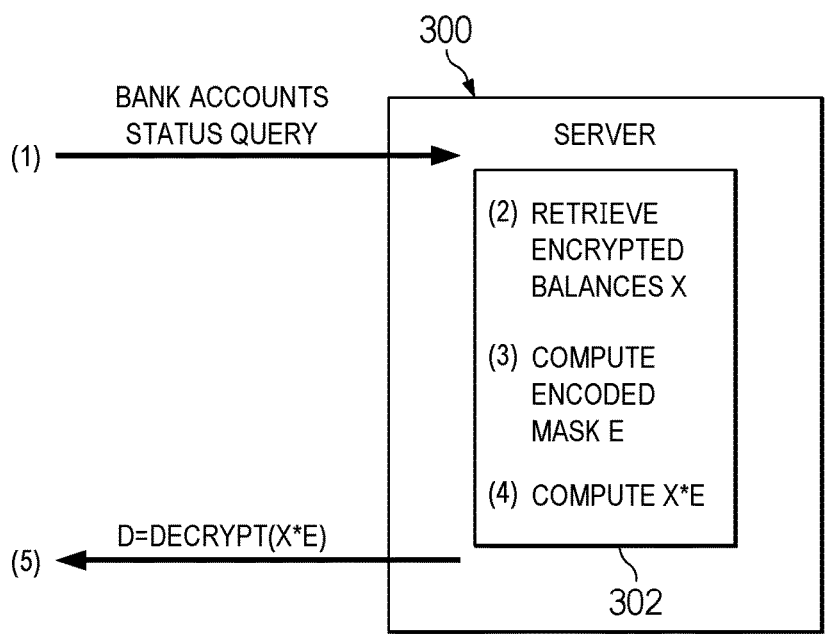
FIG. 3 depicts a first representative use case for FHE and in which the techniques herein may be practiced.

FIG. 3 depicts a first example use case that uses a server 300 to facilitate a bank query request-response workflow. This workflow implements an FHE scheme such as depicted in FIG. 2. To that end, server 300 supports a bank query lookup process 302 against which FHE-based computations are performed. In particular, and as depicted at step (1), the server 300 receives a query from a user (not shown) for a set of bank account statuses (negative/positive). Consistent with the FHE scheme, the query is an encrypted data point. At step (2), and under FHE, the server retrieves X, where X represents actual account balances. At step (3), the server 300 computes an encoded random mask E. At step (4), the server computes X*E and sends the result back to the requesting user. At step (5), the user client decrypts X*E to generate D. The values in D reveal no information except the sign (negative or positive) indicating a negative or positive balance as the case may be. As will be described below, and according to the techniques herein, typically all of the values in X are encrypted in low chain indices.

Figure 4:
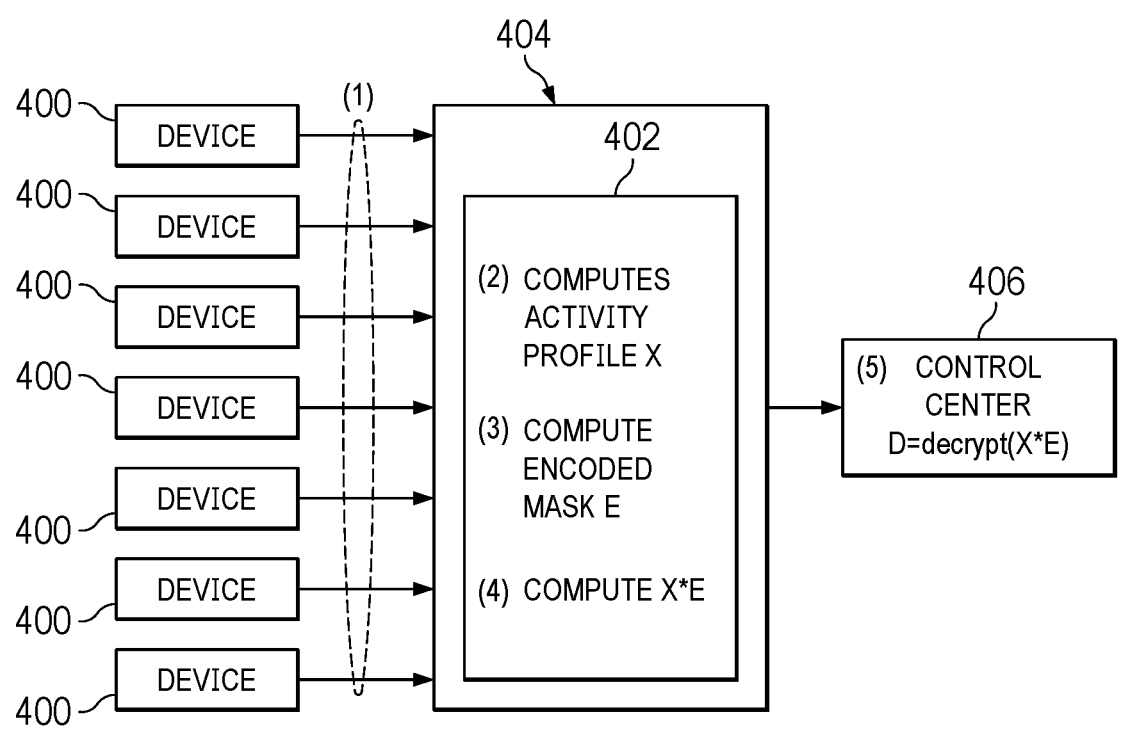
FIG. 4 depicts a second representative use case for FHE and in which the techniques herein may be practiced.

FIG. 4 depicts a second example use case. In this embodiment, there is a set of devices 400 that are being monitored by a monitor 402 executing on a server 404. In this example, the monitor is in communication with a remote control center 406. As depicted at step (1), the monitor 402 tracks the devices 400, collects the encrypted data generated by those devices, and at step (2) computes a score X (an activity profile) under FHE. At step (3), the monitor computes a random mask E. At step (4), the server computes X*E and in this use case sends the result to the control center 406. At step (5), the control center, in this case acting like the client in FIG. 3, decrypts X*E to generate D. As before, the values in D reveal no information except the sign, in this case an indication (negative or positive) of an alert with respect to a particular device in the set of multiple devices 400 being monitored. As in the FIG. 3 example, all of the values in X are encrypted in low chain indices.

These above-described use cases are not intended to be limiting.

Efficient Random Masking of Values while Maintaining their Sign Under FHE

With the above as background, the technique of this disclosure is now described. As will be seen, the technique provides for efficient random masking of homomorphically-encrypted values while maintaining their sign under FHE. Preferably, the technique is implemented in the context of an FHE system that returns or provides a vector, and where only the signs of the computed values are required by the receiving entity (e.g., the user in FIG. 3, or the control center entity in FIG. 4). In a preferred embodiment, the technique is implemented in FHE systems such as CKKS, although this is not a limitation. According to this technique, and given a ciphertext C of N slots with real number values to be returned in response to an FHE query, a vector of positive real numbers and that can be encoded with low scale (e.g., a scale=1) is discovered. The ciphertext C is sometimes referred to herein as an intermediate vector, and the vector of positive real numbers is sometimes referred to as a mask vector. For masking purposes, the intermediate vector is multiplied under FHE with the masking vector. The technique of this disclosure solves the problem of discovering an appropriate mask vector to facilitate the making operation. Preferably, and as will be explained below, the mask vector is discovered using an iterative trial and error operation and in a manner that is configured to succeed with a high probability. Once the mask vector is discovered, it is then used to mask the ciphertext.

Figures 5, 6:
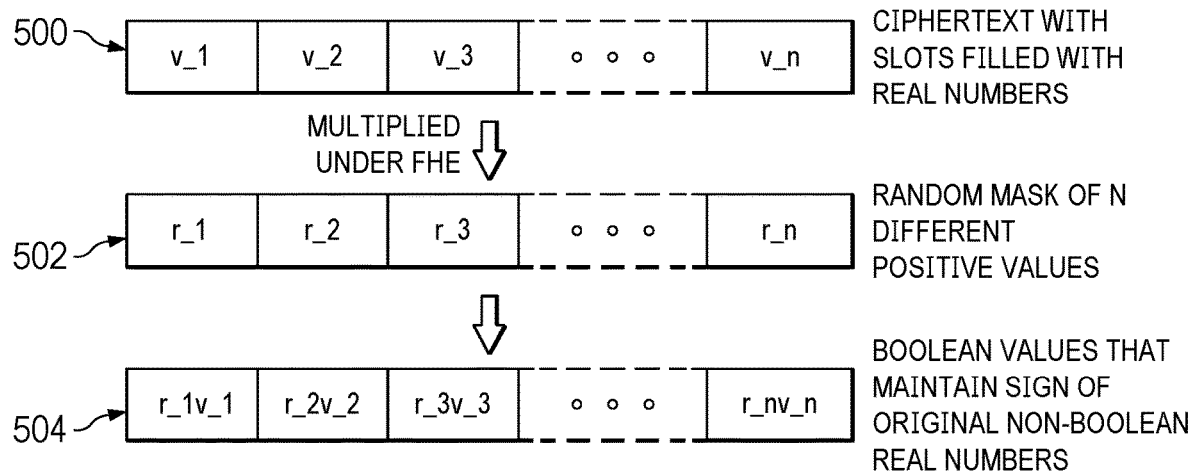
FIG. 5 depicts the masking technique of this disclosure.
FIG. 6 depicts an algorithm for determining a mask for use with a particular ciphertext according to the techniques of this disclosure.

FIG. 5 depicts a set of operations that leverage the technique herein. These operations are carried out with respect to a ciphertext C, depicted as reference numeral 500, containing original real values $\{v_1, v_2, v3, \ldots v_n\}$ computed, for example, on a server. This is the intermediate vector. Before sending the ciphertext back to the requesting client (or otherwise to an intended receiving entity), the ciphertext C is multiplied under FHE by a vector of scalers $\{r_1, r_2, r3, \ldots r_n\}$, wherein in this example the scalar values are in the range [1, 10000], and depicted as reference numeral 502. The vector 502 is the mask vector (a random mask). The vector that results from the multiplication of the intermediate vector 500 and the mask vector 502 is depicted by reference numeral 504. Vector 504 is sometimes referred to here as the result vector. In particular, and as previously explained, the user or other receiving entity decrypts the result vector 504 and computes sign for each of the respective real values in the original ciphertext.

According to this disclosure, it is desired to ensure that the random mask (vector 502 in FIG. 5) is produced in such as a way as to ensure that the scheme does not consume multiplication depth or that would otherwise require bootstrapping of the FHE ciphertext. To this end, FIG. 6 depicts a preferred algorithm for finding a random mask. The algorithm finds a random mask of N different positive values that maintain the sign of those values and that require minimal rescale operations. The number of positive values is the same as the number of values in the ciphertext C. The algorithm achieves this result by finding some random vector of positive values that remain positive after encoding with minimum scale (in order to delay or avoid future rescale and bootstrap operations). Not every random vector has this desired property; thus, the algorithm is designed to iterate in a trial and error manner, and so as to test several random vectors for each scale before moving up to a higher scale, and until a valid mask (that meets the desired properties) is found. After the output mask is found, the ciphertext C is multiplied by the mask to produce a masked ciphertext that is sent to the user.

As seen in FIG. 6, the inputs to the algorithm are N, a number of random values in the mask; maxVal, a maximal value of the random values, and; a number-of-trials. As detailed below, the algorithm depicted in FIG. 6 is used to discover a mask E of positive random numbers. As previously noted, masking the vector of (encrypted) real values under FHE while maintaining their sign enables the conversion of the non-Boolean results to Boolean (the sign data) while hiding intermediate values, thus exposing as least information as possible. Further, by using a random mask of positive numbers encoded with a low scale reduces the product cost of doing this masking operation.

Referring now to FIG. 6, the random mask vector is generated using a trial and error approach. The code depicted corresponds to the mask code 200 depicted in FIG. 1. As shown, a min value (corresponding to the scale) is set to a low value, e.g., min=1. Then, and while min is less than or equal to the maximal value divided by 2 (maxval/2), the algorithm performs one or more iterations. In particular, and for each i in the range [0, number-of-trials], the following operations are performed. At line (1), a vector R of N random values in the range [min, maxval] is generated. At line (2), the vector R is encoded, preferably under CKKS, with scale=1. This encode operation generates E. At line (3), the result of the encoding in line (2) is then decoded. This is decode operation D. At line (4), a test is run to determine if the decode operation encodes a vector of positive values. If so, the result of the encode operation is returned as the mask. If, however, D does not encode a vector of positive values, the min variable is then indexed at line (5) by setting min=min*2, and the iterates for at most number-of-trials times as long as min is still less than or equal to maxval/2. If there is no success in all of these iterations, then a not-found response is returned. In such case, which is expected to be rare, the system may revert to using N random values and paying a penalty of one multiplication.

Using this algorithm, a mask typically is found after a few iterations, and thus the process is quite efficient. In particular, the vector of positive numbers generated can be encoded with a scale of 1, thus having no product (multiplication) cost in the CKKS FHE scheme.

The technique of this disclosure provides significant advantages. Masking a vector of (encrypted) real values under FHE while maintaining their sign as described above enables converting of non-Boolean results to Boolean while hiding intermediate values, thereby ensuring that the least information as possible is exposed during the process. By using a random mask of positive numbers encoded with a low scale as described herein reduces the product cost of performing this masking operation, as products are costly in FHE computations. The described method may be implemented in many types of FHE schemes and is applicable to a wide range of computations. As described, and in a preferred embodiment, specific properties of the CKKS scheme are relied upon. In particular, the approach herein reduces multiplication depth because it circumvents paying in multiplication levels for multiplying with the mask.

Generalizing, the method according to this disclosure may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed subject matter are each a data processing system (such as shown in FIG. 1) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

As also depicted in FIG. 1, the scheme described herein may be implemented in or in conjunction with various server-side architectures including simple n-tier architectures, web portals, federated systems, and the like. The techniques herein may also be practiced in whole or in part in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the analytics engine functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible item.

In a representative embodiment, the FHE system and the mask code are implemented in a special purpose computer, preferably in software executed by one or more processors. The software is maintained in one or more data stores or memories associated with the one or more processors, and the software may be implemented as one or more computer programs. Collectively, this special-purpose hardware and software comprises the system described above.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

As already mentioned, the techniques disclosed herein are not limited to any particular homomorphic encryption protocol such as CKKS, but this will be a typical implementation. More generally, the approach herein may be implemented in CKKS, any CKKS derivative, or in any similar FHE scheme that supports real values with scales.

The techniques herein provide for improvements to another technology or technical field, namely, homomorphic inferencing systems, as well as improvements to the operational capabilities of such systems when used in the manner described.

While typically the trial and error approach to finding the mask vector occurs during the homomorphic inferencing on an encrypted data point that is received for evaluation, the mask vector may be identified in advance where the nature of the response to that encrypted data point can be estimated or predicted.

The nature of the data that is subject to the homomorphic inferencing is dependent on the application and is not intended to be limited. Example data types include financial, medical, genomic, measurement data, testing data, and so forth.

Having described the subject matter, what is claimed is as follows.

The invention claimed is:

1. A method for privacy-preserving homomorphic inferencing, comprising:
   receiving an encrypted data point;
   in response to receipt of the encrypted data point, generating a ciphertext having one or more real numbers each having an associated sign;
   identifying a mask comprising a set of values that are randomly distributed over a given positive range and that remain positive after encoding under a fixed-point arithmetic and with a scale value, wherein the fixed-point arithmetic is Cheon-Kim-Kim-Song (CKKS) scheme;
   under homomorphic encryption, multiplying the ciphertext by the mask to generate a result, the result comprising one or more values corresponding to the one or more real numbers in the ciphertext, the one or more values in the result maintaining the associated signs of the one or more real numbers in the ciphertext to which the values correspond; and
   providing the result as a response to the encrypted data point.

2. The method as described in claim 1 wherein the scale value is 1.

3. The method as described in claim 2 wherein the set of values in the mask are identified by an iterative algorithm that, for one or more increasing minimum values of a range from which random values are selected, each minimum value as adjusted by the scale value corresponding to an iteration, evaluates encodings of the random values under the fixed-point arithmetic until the set of values in the mask are identified.

4. The method as described in claim 1 wherein the ciphertext is multiplied by the set of values under fully homomorphic encryption.

5. The method as described in claim 4 wherein the fixed-point arithmetic is a homomorphic encryption scheme for approximate arithmetic.

6. The method as described in claim 1 wherein the one or more values in the result differ in magnitude from the one or more real numbers in the ciphertext.

7. An apparatus, comprising:
a processor;
computer memory holding computer program instructions executed by the processor to provide privacy-preserving homomorphic inferencing, the computer program instructions comprising program code configured to:
receive an encrypted data point;
in response to receipt of the encrypted data point, generate a ciphertext having one or more real numbers each having an associated sign;
identify a mask comprising a set of values that are randomly distributed over a given positive range and that remain positive after encoding under a fixed-point arithmetic and with a scale value, wherein the fixed-point arithmetic is Cheon-Kim-Kim-Song (CKKS) scheme;
under homomorphic encryption, multiply the ciphertext by the mask to generate a result, the result comprising one or more values corresponding to the one or more real numbers in the ciphertext, the one or more values in the result maintaining the associated signs of the one or more real numbers in the ciphertext to which the values correspond; and
provide the result as a response to the encrypted data point.

8. The apparatus as described in claim 7 wherein the scale value is 1.

9. The apparatus as described in claim 8 wherein the program code configured to identify the set of values in the mask comprises an iterative algorithm that, for one or more increasing minimum values of a range from which random values are selected, each minimum value as adjusted by the scale value corresponding to an iteration, evaluates encodings of the random values under the fixed-point arithmetic until the set of values in the mask are identified.

10. The apparatus as described in claim 7 wherein the ciphertext is multiplied by the set of values under fully homomorphic encryption.

11. The apparatus as described in claim 10 wherein the fixed-point arithmetic is a homomorphic encryption scheme for approximate arithmetic.

12. The apparatus as described in claim 7 wherein the one or more values in the result differ in magnitude from the one or more real numbers in the ciphertext.

13. A computer program product comprising: a non-transitory computer readable medium, the computer program product holding computer program instructions executed by a processor in a host processing system to provide privacy-preserving homomorphic inferencing, the computer program instructions comprising program code configured to:
receive an encrypted data point;
in response to receipt of the encrypted data point, generate a ciphertext having one or more real numbers each having an associated sign;
identify a mask comprising a set of values that are randomly distributed over a given positive range and that remain positive after encoding under a fixed-point arithmetic and with a scale value, wherein the fixed-point arithmetic is Cheon-Kim-Kim-Song (CKKS) scheme;
under homomorphic encryption, multiply the ciphertext by the mask to generate a result, the result comprising one or more values corresponding to the one or more real numbers in the ciphertext, the one or more values in the result maintaining the associated signs of the one or more real numbers in the ciphertext to which the values correspond; and
provide the result as a response to the encrypted data point.

14. The computer program product as described in claim 13 wherein the scale value is 1.

15. The computer program product as described in claim 14 wherein the program code configured to identify the set of values in the mask comprises an iterative algorithm that, for one or more increasing minimum values of a range from which random values are selected, each minimum value as adjusted by the scale value corresponding to an iteration, evaluates encodings of the random values under the fixed-point arithmetic until the set of values in the mask are identified.

16. The computer program product as described in claim 13 wherein the ciphertext is multiplied by the set of values under fully homomorphic encryption.

17. The computer program product as described in claim 16 wherein the fixed-point arithmetic is a homomorphic encryption scheme for approximate arithmetic.

18. The computer program product as described in claim 13 wherein the one or more values in the result differ in magnitude from the one or more real numbers in the ciphertext.

* * * * *